United States Patent
Cairo-Iocco et al.

(10) Patent No.: US 6,371,410 B1
(45) Date of Patent: Apr. 16, 2002

(54) EMERGENCY LANDING IMPACT ABSORBING SYSTEM FOR AIRCRAFT

(75) Inventors: Renee Cairo-Iocco, Silver Spring, MD (US); Thomas E. Wenzel, South West Leesburg, VA (US); Eugene C. Fischer, Stevensville, MD (US)

(73) Assignee: The United States of America represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/717,047

(22) Filed: Nov. 22, 2000

Related U.S. Application Data

(63) Continuation-in-part of application No. 09/671,861, filed on Sep. 28, 2000.

(51) Int. Cl.[7] .............................................. B64C 25/56
(52) U.S. Cl. ............................. 244/100 A; 244/100 R; 244/110 E; 244/17.17; 244/17.15; 244/107
(58) Field of Search .................... 244/138 R, 139, 244/17.17, 17.13, 17.15, 107, 100 R, 100 A, 110 E, 34 R

(56) References Cited

U.S. PATENT DOCUMENTS

| | | | | |
|---|---|---|---|---|
| 1,791,024 A | * | 2/1931 | Eller | 244/107 |
| 3,738,597 A | * | 6/1973 | Earl et al. | 244/100 A |
| 4,382,567 A | * | 5/1983 | Fredericks et al. | 244/107 |
| 4,923,145 A | * | 5/1990 | Broadhurst | 244/100 A |
| 5,259,574 A | | 11/1993 | Carrot | |
| 5,560,568 A | * | 10/1996 | Schmittle | 244/110 E |
| 5,765,778 A | | 6/1998 | Otsuka | |
| 5,992,794 A | | 11/1999 | Rotman et al. | |
| 6,042,051 A | * | 3/2000 | Hagerty | 244/100 A |
| 6,158,691 A | * | 12/2000 | Menne et al. | 244/100 A |
| 6,227,494 B1 | * | 5/2001 | Turner | 244/100 R |
| 6,237,875 B1 | * | 5/2001 | Menne et al. | 244/138 R |

FOREIGN PATENT DOCUMENTS

| | | | | |
|---|---|---|---|---|
| DK | 4118300 | * | 10/1992 | 244/100 A |

* cited by examiner

Primary Examiner—Michael J. Carone
Assistant Examiner—Lulit Semunegus
(74) Attorney, Agent, or Firm—Jacob Shuster

(57) ABSTRACT

Inflation of impact absorbing bags is effected on a portable platform positioned on an emergency landing zone after jettisoning of damaged landing gear from a helicopter fuselage. The impact absorbing bags when inflated form a cradle shape conforming to the bottom of the helicopter fuselage.

4 Claims, 1 Drawing Sheet

EMERGENCY LANDING IMPACT ABSORBING SYSTEM FOR AIRCRAFT

The present invention relates generally to emergency, non-crash landing of aircraft after damage to its landing gear, and is a continuation in part of Ser. No. 09/671,861 filed Sep. 28, 2000, with respect to which the present application is a continuation-in-part.

BACKGROUND OF THE INVENTION

The use of pressurized gas inflated bags to absorb impact during emergency landing of an aircraft, has already been proposed in accordance with various prior art safety landing systems, as respectively disclosed for example in U.S. Pat. No. 5,259,574 to Carrot, U.S. Pat. No. 5,765,778 to Otsuka and U.S. Pat. No. 5,992,794 to Rotman et al. The inflated bags cushion impact with a landing surface otherwise stricken by the fixed landing gear associated with a helicopter type of aircraft as disclosed in the foregoing referred to prior copending patent application and in the patents to Carrot and Rotman et al. Such inflated bags when deployed project from the bottom of the helicopter to engage the landing surface during a crash or difficult project from the bottom of the object of the present invention to deploy a landing platform on which such impact absorbing crash landing bags are arranged for safer landing of the helicopter.

SUMMARY OF THE INVENTION

In association with the present invention, the mechanical helicopter landing gear is jettisoned from the bottom of the helicopter when damaged before emergency landing on a prepackaged platform subsequently deployed on some landing zone. Impact absorbing bags associated with such landing platform when inflated are arranged in a cradle formation conforming to the bottom of the helicopter fuselage for stabilizing support thereof in a safe landing position. Inflation of the bags is initiated by operation of a gas generator in response to triggering by the same helicopter pilot controlled signal which effects jettisoning of the damaged landing gear.

BRIEF DESCRIPTION OF DRAWING

A more complete appreciation of the invention and many of its attendant advantages will be readily appreciated as the same becomes better understood by reference to the following detailed description when considered in connection with the accompanying drawing herein.

DETAILED DESCRIPTION OF PREFERRED EMBODIMENT

Figure 1:
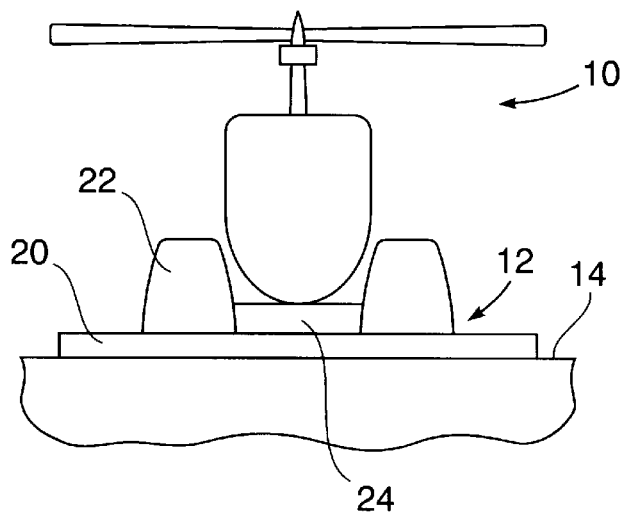
FIG. 1 is a simplified front elevation view of a landed helicopter after inflation of impact absorbing bags of a deployed emergency landing platform.
Figure 2:
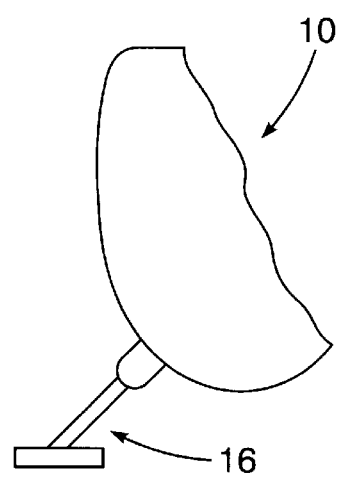
FIG. 2 is a partial front elevation view of the helicopter shown in FIG. 1, prior to landing thereof.

Referring now to the drawing in detail, FIG. 1 illustrates an aircraft such as a conventional type of helicopter 10 which has landed on an emergency landing platform 12 positioned on a landing zone such as the landing deck 14 of an aircraft carrier. Such helicopter 10 had on the bottom thereof landing gears 16, as shown in FIG. 2, which were jettisoned therefrom before landing. Each landing gear 16 is releasably attached to the helicopter fuselage through a commercially available type of explosive bolt assembly 18, as diagrammed in FIG. 3, so that it may jettisoned from the fuselage after detection of damage thereto.

FIG. 1 illustrates three inflated gas bags mounted on a flat access plate 20 of the emergency landing platform 12, such bags consisting of a pair of side bags 22 and an intermediate bag 24 therebetween. The lowermost surface of the fuselage is in contact with the inflated bag 24 for soft support thereof, while horizontal stability of the landed fuselage is maintained by the side bags 22 in their inflated condition. The foregoing arrangement of inflated bags on the landing platform 12 results from deployment on the deck surface 14 prior to emergency safe landing of the helicopter 10.

Figure 3:
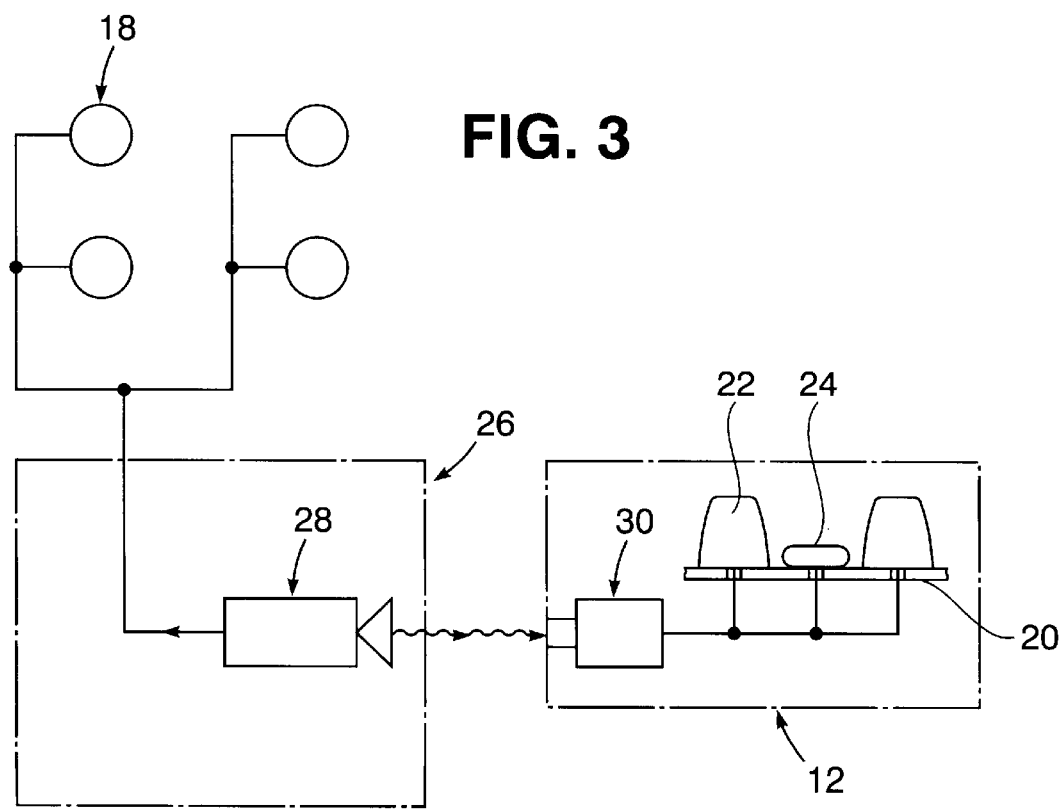
FIG. 3 is a diagram of the deployment system associated with the arrangement shown in FIGS. 1 and 2.

FIG. 3 diagrams a deployment system 26 mounted within the helicopter 10. Such deployment system according to one embodiment includes a pilot-controlled signaling device 28 connected to the explosive bolt assemblies 18 to jettison damaged landing gear 16 as aforementioned. Also, the signaling device 28 is operative to trigger a gas generator 30 associated with the emergency landing platform 12 for gas inflation of the bags 22 and 24.

The operational sequence of the deployment system 26 hereinbefore described involves signal triggering of the explosive bolt assemblies 18 to effect jettisoning of damaged landing gear followed by signal triggered inflation of the impact absorbing bags 22 and 24 of the emergency landing platform 12 positioned on the deck 14. The portability of such landing platform 12 with the bags 22 and 24 mounted thereon enables it to be transported to various remote locations at which emergency landing is desired, including an amphibious landing zone or on an aircraft carrier deck 14.

Obviously, other modifications and variations of the present invention may be possible in light of the foregoing teachings. It is therefore to be understood that within the scope of the appended claims the invention may be practiced otherwise than as specifically described.

What is claimed is:

1. In combination with aircraft having a fuselage from which landing gear extends, a portable landing platform having impact absorbing means for accommodating emergency landing of the aircraft after jettisoning of the landing gear, said impact absorbing means including: a plurality of gas inflatable bags establishing a cradle formation conforming to the fuselage of the aircraft.

2. The combination as defined in claim 1, wherein said bags consist of a pair of stability maintaining side bags and an intermediate soft contact bag between the side bags engaged by a lowermost portion of the fuselage.

3. The combination as defined in claim 2, including deployment means for sequentially effecting said jettisoning of the landing gear by signal triggered explosions and inflation of the bags by signal triggered gas generation.

4. The combination as defined in claim 1, including deployment means for sequentially effecting said jettisoning of the landing gear by signal triggered explosions and inflation of the bags by signal triggered gas generation.

* * * * *